(12) United States Patent
Min et al.

(10) Patent No.: US 8,805,120 B2
(45) Date of Patent: Aug. 12, 2014

(54) IMAGE PROCESSING APPARATUS AND METHOD WHICH GENERATES REFERENCE DATA ACCORDING TO LEARNING IMAGES

(75) Inventors: Kyung-sun Min, Suwon-si (KR); Bo-gun Park, Suwon-si (KR); Byung-cheol Song, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 960 days.

(21) Appl. No.: 12/911,830

(22) Filed: Oct. 26, 2010

(65) Prior Publication Data

US 2011/0142330 A1 Jun. 16, 2011

(30) Foreign Application Priority Data

Dec. 10, 2009 (KR) .................. 10-2009-0122717

(51) Int. Cl.
*G06K 9/62* (2006.01)
*G06K 9/32* (2006.01)

(52) U.S. Cl.
USPC .......................................... 382/299; 382/224

(58) Field of Classification Search
USPC ................................. 382/299, 224
See application file for complete search history.

(56) References Cited

U.S. PATENT DOCUMENTS

| | | | | |
|---|---|---|---|---|
| 7,130,776 B2* | 10/2006 | Ii et al. | ................. | 703/2 |
| 7,336,818 B2* | 2/2008 | Kondo et al. | ................. | 382/164 |
| 7,343,040 B2* | 3/2008 | Chanas et al. | ................. | 382/172 |
| 7,385,650 B2* | 6/2008 | Kondo et al. | ................. | 348/561 |
| 7,403,235 B2* | 7/2008 | Nakaya et al. | ................. | 348/581 |
| 7,852,404 B2* | 12/2010 | Kondo et al. | ................. | 348/441 |
| 7,974,476 B2* | 7/2011 | Zhang et al. | ................. | 382/225 |
| 8,331,713 B2* | 12/2012 | Shiraki et al. | ................. | 382/255 |
| 8,363,970 B2* | 1/2013 | Suto et al. | ................. | 382/254 |
| 2002/0067857 A1* | 6/2002 | Hartmann et al. | ........... | 382/224 |
| 2005/0008260 A1* | 1/2005 | Kondo et al. | ................. | 382/299 |
| 2005/0013508 A1* | 1/2005 | Kondo et al. | ................. | 382/300 |
| 2006/0104540 A1* | 5/2006 | Haussecker et al. | .......... | 382/276 |
| 2007/0019887 A1* | 1/2007 | Nestares et al. | ............. | 382/299 |
| 2007/0116383 A1* | 5/2007 | De Haan | ....................... | 382/299 |

FOREIGN PATENT DOCUMENTS

| | | |
|---|---|---|
| EP | 1321896 A2 | 6/2003 |
| JP | 2009-171620 A | 7/2009 |

OTHER PUBLICATIONS

Communication issued on Oct. 4, 2012 from the European Patent Office in the counterpart European Patent Application No. 10187171.3.

David, Robert et al., "Noise reductions and image enhancement using a hardware implementation of artificial neural networks", Proceedings of SPIE, vol. 3728, Jan. 1, 1999, p. 212-221.

(Continued)

*Primary Examiner* — Kathleen Dulaney
(74) *Attorney, Agent, or Firm* — Sughrue Mion, PLLC

(57) ABSTRACT

An image processing apparatus and an image processing method, the image processing apparatus including: an image input unit which receives an image; and an image processing unit which generates reference data on the basis of a plurality of learning images classified into a plurality of first classes according to a noise characteristic and a plurality of second classes according to an image characteristic, and which performs scaling for the received image on the basis of the generated reference data.

23 Claims, 13 Drawing Sheets

(56) References Cited

OTHER PUBLICATIONS

Madani, Kurosh et al., "Image Processing Using RBF like Neural Networks: A ZISC-036 Based Fully Parallel Implementation Solving Real World and Real Complexity Industrial Problems", Applied Intelligence, Kluwer Academic Publishers, vol. 18, No. 2, Mar. 1, 2003, p. 195-213.

Madani, Kurosh et al., "ZISC-036 Neuro-processor Based Image Processing", 6th International Work-Conference on Artificial and Natural Neural Networks, Jun. 2001, p. 200-207.

Extended European Search Report dated Mar. 15, 2011, in Application No. 10187171.3.

Communication issued on Mar. 30, 2012 by the European Patent Office in the counterpart European Patent Application No. 10187171.3.

* cited by examiner

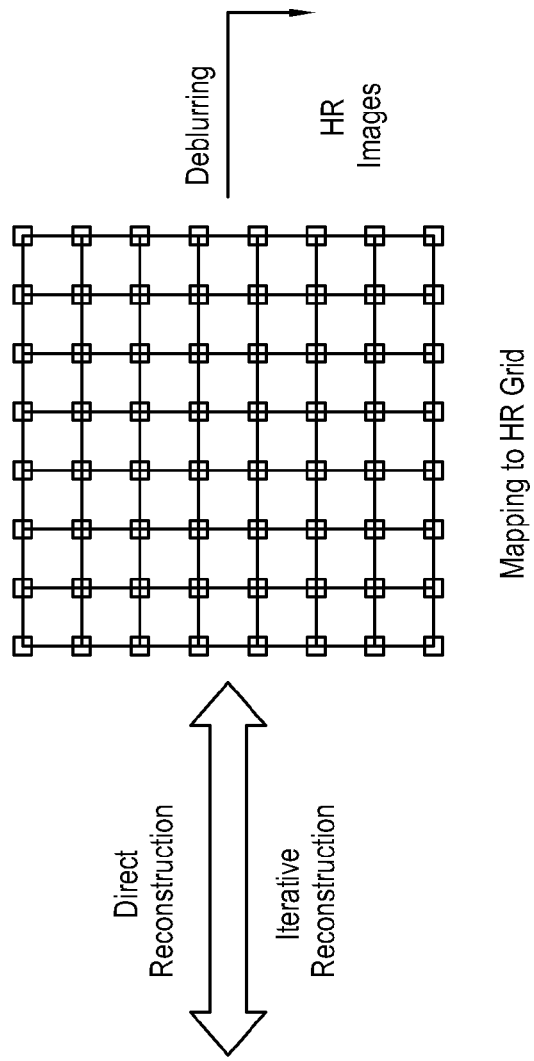
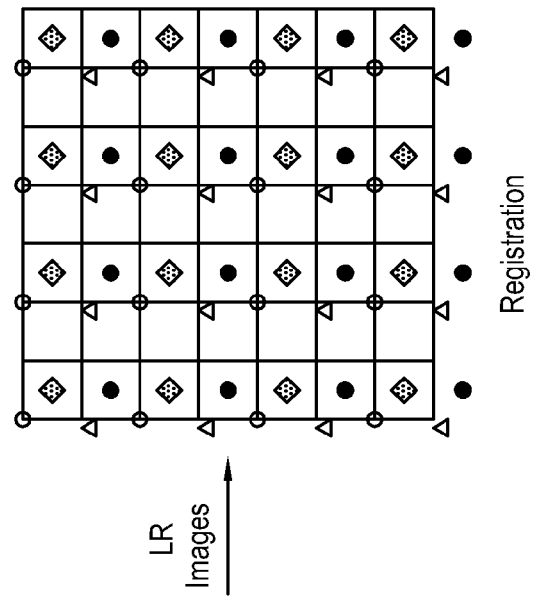
FIG. 1B
FIG. 1A

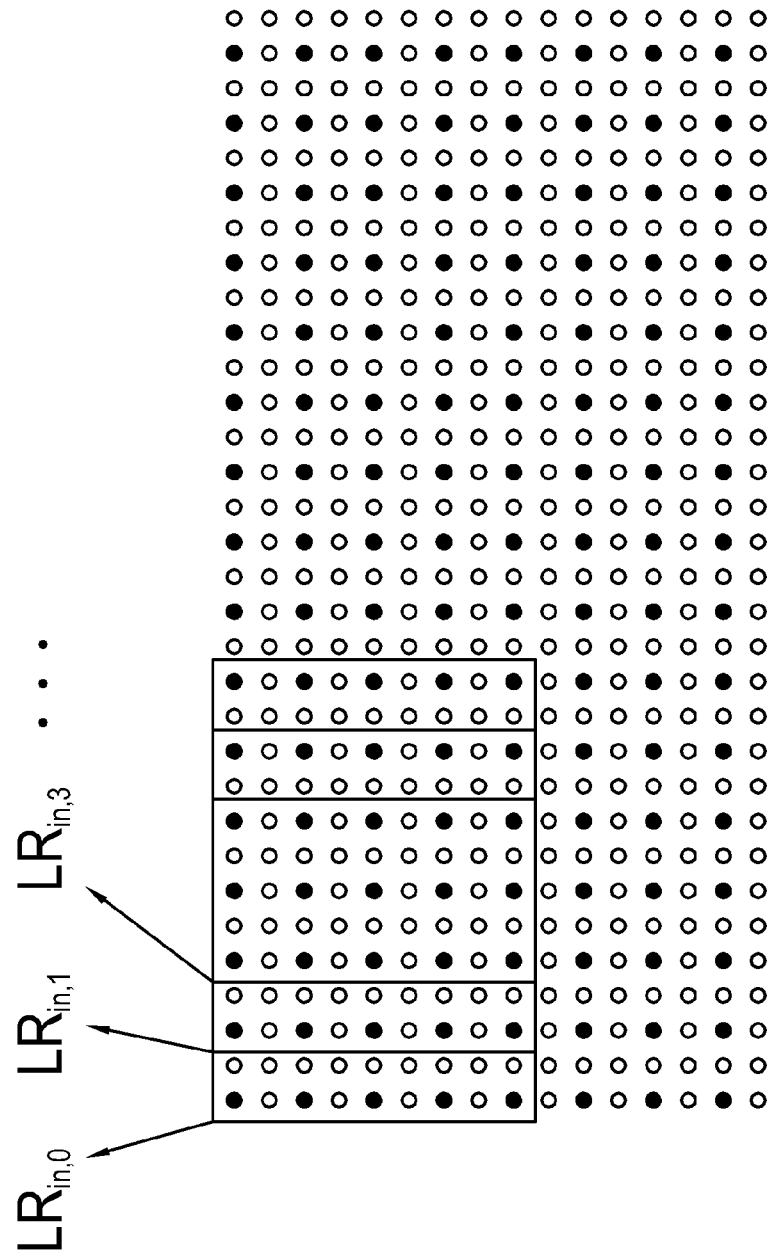

IMAGE PROCESSING APPARATUS AND METHOD WHICH GENERATES REFERENCE DATA ACCORDING TO LEARNING IMAGES

CROSS-REFERENCE TO RELATED APPLICATION

This application claims priority from Korean Patent Application No. 10-2009-0122717, filed on Dec. 10, 2009 in the Korean Intellectual Property Office, the disclosure of which is incorporated herein by reference.

BACKGROUND

1. Field

Apparatuses and methods consistent with the exemplary embodiments relate to an image processing apparatus and an image processing method which is capable of effectively generating a high resolution image from a low resolution image through learning even under environments having various noises.

2. Description of the Related Art

Scaling for enlarging or reducing the size of an image is an important technique in the field of image display apparatuses. Recently, with rapid increase of a screen size and a resolution, the scaling technique has been developed to generate a high quality image, beyond simple enlargement or reduction of an image.

Super-resolution (SR) technique is one of a variety of techniques for generating a high quality image. The SR technique is classified into multiple-frame SR for extracting a single high resolution image from a plurality of low resolution images and single-frame SR for extracting a single high resolution image from a single low resolution image.

FIGS. 1A and 1B are diagrams illustrating the multi-frame SR. In the case of the multiple-frame SR, a single high resolution image is generated through registration, etc. from a plurality of image frames of the same scene which are slightly different in phase from each other. More specifically, if a low resolution (LR) image is inputted, a plurality of pixels is extracted from each of a plurality of image frames of the same scene which are slightly different in phase from each other. For example, as shown in FIG. 1A, a plurality of pixels ○, a plurality of pixels ◇, a plurality of pixels △ and a plurality of pixels ● are sampled, respectively. In this respect, the pixels ○, the pixels ◇, the pixels △ and the pixels ● are extracted from different image frames, respectively.

Then, pixels for forming high resolution image frames are generated on the basis of the sampled pixels. For example, as shown in FIG. 1B, a plurality of pixels □ may be generated using the pixels ○, ◇, △ and ●. High resolution (HR) image frames may be generated from the pixels □.

This multiple-frame SR requires suitable movement estimation with respect to a plurality of image frames. Thus, the amount of operations is generally large, thereby causing difficulty in real-time processing. Further, a frame memory having a considerable size is required for storing the operations, thereby causing much difficulty in practical realization.

FIG. 2 is a diagram illustrating the single-frame SR. The single-frame SR is a learning-based technique which is used to overcome the problems of the multiple-frame SR. Referring to FIG. 2, in a learning process 210, pairs of blocks or patches having a predetermined size in consideration of image characteristics are generated using a variety of high resolution images and low resolution images corresponding to the high resolution images, and the generated pairs of blocks or patches are stored. In this respect, each pair of blocks or patches includes high resolution information and low resolution information.

For example, as shown in FIG. 2, in the learning process 210, the following operations are performed. First, low resolution images corresponding to a variety of high resolution images are extracted through low-pass filtering (LPF) and sub-sampling (212). Second, the low resolution images are scaled using predetermined interpolation such as cubic convolution (214). Third, low frequency components are removed from the original high resolution images and the scaled images using a Band-Pass Filter (BPF) or a High-Pass Filter (HPF). Then, examples of high frequency patches (HFP) having a predetermined size from which the low frequency components are removed and the corresponding scaled low frequency patches (LFP) are stored in a lookup table (LUT) (216).

In a synthesis or inference process (220), if an arbitrary low resolution image is input, a low resolution block in the pairs matching each block of the inputted image is searched, and high resolution information is obtained. For example, as shown in FIG. 2, in the synthesis or inference process (220), the following operations are performed. First, a low resolution image is inputted (222). Second, the inputted low resolution image is scaled, and every LFP is compared with the LFPs in the LUT. Then, an HFP corresponding to an optimal LFP which is selected in the LUT is used as a high frequency component of the inputted patch (224). Third, an extracted high resolution image is outputted (226). In this respect, the matching may be performed so that a high frequency component in a causal region which has been previously obtained in the optimal matching (searching) process is slightly overlapped, to thereby provide smoothness with respect to surrounding regions.

The single-frame SR has a relatively small operational amount compared with the multiple-frame SR. However, even in the case of the single-frame SR, since every LFP should be compared with all the LFPs in the LUT, an operational amount is significantly large in real applications. Further, there exists a problem in which scaling efficiency deteriorates according to a noise. Thus, it is necessary to provide a technique which can effectively reduce an operational amount while removing influences due to noises.

FIG. 3 illustrates a process of scaling an image mixed with noises. In order to scale the noise-mixed image, a cascade technique is typically used which firstly removes noises and then interpolates the image, as shown in FIG. 3. That is, referring to FIG. 3, if a low resolution image mixed with noises is inputted, the noises are firstly removed through a noise removing process (310), and new pixels are subsequently generated through an image interpolating process (320). In this way, a high resolution image may be output with noises being removed.

However, according to the cascade technique, noises may remain after passing through the noise removing process, which may cause deterioration in a scaling. Further, in the case of the learning-based single-frame SR, if a blurred image is inputted after noise removing, the SR process may be affected according to the degree of the blur.

SUMMARY

Accordingly, it is an aspect of the exemplary embodiments to provide an image processing apparatus and an image processing method which efficiently generate a high resolution image from a low resolution image through learning, even under environments having various noises.

Another aspect of the exemplary embodiments is to provide an image processing apparatus and an image processing method can enhances a scaling ability by performing matching after initial noise removal in a learning process and a high resolution image synthesizing process, and selects a lookup table according to a local noise characteristic, to thereby perform effective noise removal and scaling at the same time, in the case where a low resolution image with noises is up-scaled to a high resolution image without noises using the lookup table which includes high frequency synthesizing information previously obtained through learning.

According to an aspect of an exemplary embodiment, there is provided an image processing apparatus including: an image input unit which receives an image; and an image processing unit which generates reference data on the basis of a plurality of learning images which are classified into a plurality of first classes according to a noise characteristic and a plurality of second classes according to an image characteristic, and which performs scaling for the received image on the basis of the generated reference data.

The image processing unit may classify each of the plurality of first classes into the plurality of second classes.

The learning images may include pairs of low resolution images and high resolution images corresponding to the low resolution images.

The reference data may include pairs of the low resolution images and corresponding weights which are set according to the image characteristic.

The image processing unit may convert a low resolution image having noises into a high resolution image.

The image characteristic may include at least one of a high frequency component and an edge characteristic of the image.

The noise characteristic may include at least one of a kind and an intensity of noises.

The image processing unit may predict, in a case where the received image is distorted by noise, an intensity of the noise in a region unit of the received image.

The image processing unit may perform the scaling for the received image on the basis of the reference data corresponding to a noise characteristic and an image characteristic of the received image.

According to an aspect of another exemplary embodiment, there is provided an image processing method including: receiving an image; generating reference data on the basis of a plurality of learning images classified into a plurality of first classes according to a noise characteristic and a plurality of second classes according to an image characteristic; and performing scaling for the received image on the basis of the generated reference data.

Each of the plurality of first classes may be classified into the plurality of second classes.

The learning images may include pairs of low resolution images and high resolution images corresponding to the low resolution images.

The reference data may include pairs of the low resolution images and corresponding weights which are set according to the image characteristic.

A low resolution image having noise may be converted into a high resolution image.

The image characteristic may include at least one of a high frequency component and an edge characteristic of the image.

The noise characteristic may include at least one of a kind and an intensity of noises.

The intensity of noises may be predicted in a region unit of the received image, in a case where the received image is distorted by the noises.

The scaling may be performed for the received image on the basis of the reference data corresponding to a noise characteristic and an image characteristic of the received image.

According to an aspect of another exemplary embodiment, there is provided a method of generating reference data used to scale an image, the method including: inserting noise in a low resolution image; predicting an intensity of the inserted noise in the low resolution image; removing the noise from the low resolution image; classifying the low resolution image and a corresponding high resolution image into a first class, of a plurality of first classes, according to the predicted intensity of the inserted noise; classifying the low resolution image and the corresponding high resolution image into a second class, of a plurality of second classes, according to an image characteristic; and generating the reference data according to the classified low resolution image.

According to the exemplary embodiments, a high resolution image can be effectively generated from a low resolution image even under environments having noises. Thus, a user can enjoy the high resolution image from an image signal of low quality or low resolution, through a high resolution image processing apparatus.

BRIEF DESCRIPTION OF THE DRAWINGS

The above and/or other aspects will become apparent and more readily appreciated from the following description of the exemplary embodiments, taken in conjunction with the accompanying drawings, in which:

FIGS. 1A and 1B are diagrams illustrating multiple-frame SR;

FIG. 12 is a diagram illustrating a process of generating an HR block corresponding to an LR block according to an exemplary embodiment.

DETAILED DESCRIPTION OF EXEMPLARY EMBODIMENTS

Figure 2:
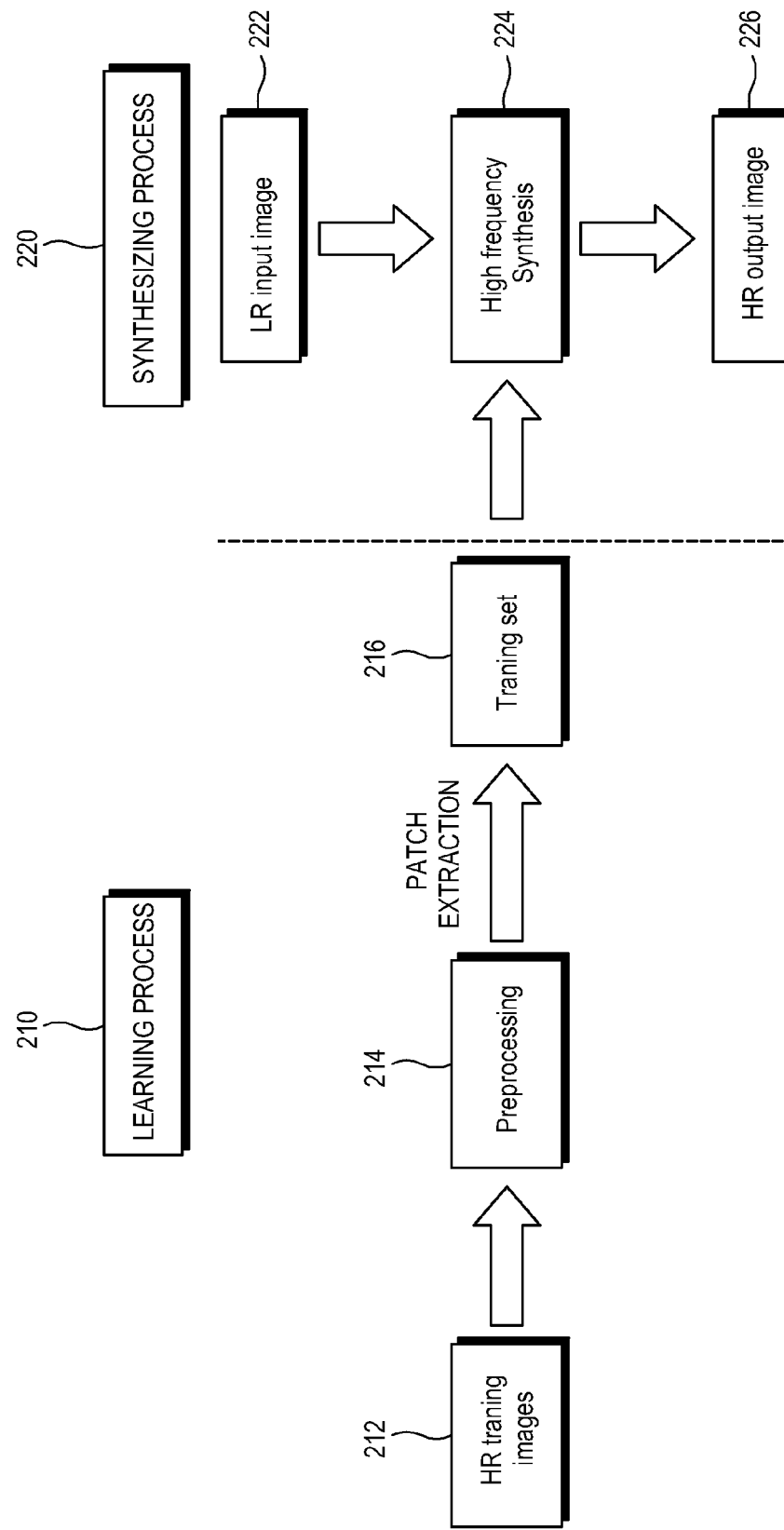
FIG. 2 is a diagram illustrating single-frame SR.
Figure 3:
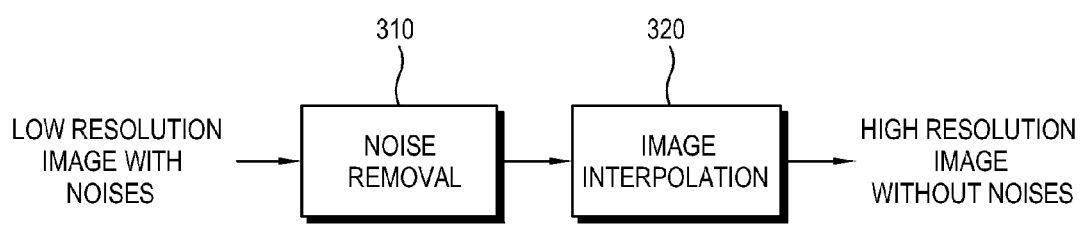
FIG. 3 is a diagram for illustrating a process of scaling an image mixed with noises.

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout. Expressions such as "at least one of," when preceding a list of elements, modify the entire list of elements and do not modify the individual elements of the list.

Figure 4:
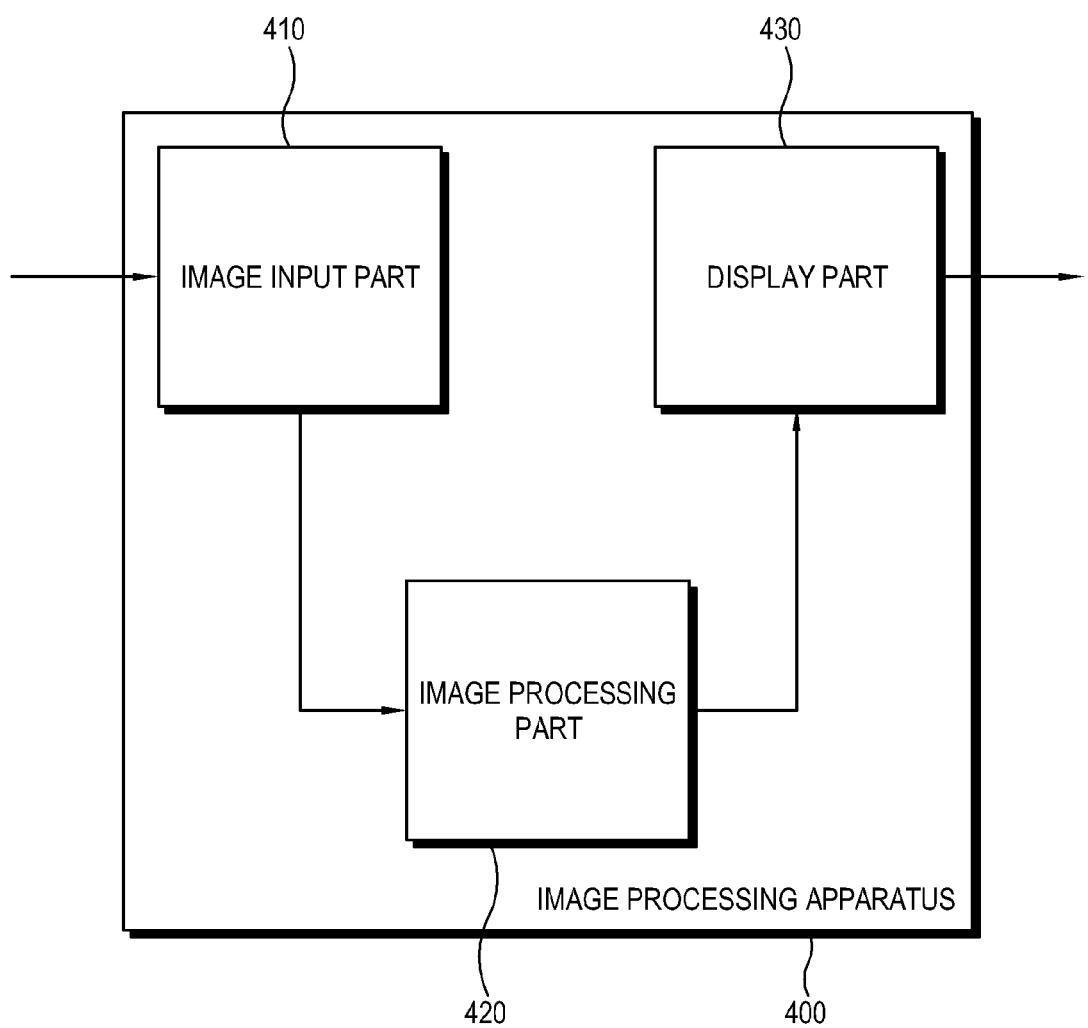
FIG. 4 is a block diagram illustrating a configuration of an image processing apparatus according to an exemplary embodiment.

FIG. 4 is a block diagram illustrating a configuration of an image processing apparatus 400 according to an exemplary embodiment. The image processing apparatus 400 may be provided as a digital TV, a desktop computer, a laptop computer, a large format display (LFD), a digital camera, a mobile device, a set-top box, a display device, or the like. Further, the image processing apparatus 400 may be provided as any electronic device which can perform image scaling.

Referring to FIG. 4, the image processing apparatus 400 may include an image input unit 410, an image processing unit 420, and a display unit 430.

The image input unit 410 may receive an image. The received image may be a low resolution image or a high resolution image. The low resolution image may be an image mixed with noises.

The image processing unit 420 may generate reference data on the basis of a plurality of learning images which belong to a first class with reference to a noise characteristic and a second class with reference to an image characteristic.

According to an exemplary embodiment, the image processing unit 420 may classify each of the plurality of first classes into the plurality of second classes. More specifically, images may be classified into the plurality of first classes according to the intensity of noises, and the images which are included in each of the first classes may be classified into the plurality of second classes by clustering to have a similar high frequency characteristic.

The learning images may include pairs of low resolution images and high resolution images corresponding to the low resolution images. The reference data may include pairs of the low resolution images and weights set according to the corresponding to the image characteristic. The image characteristic may include at least one of a high frequency component and an edge characteristic of the image. The noise characteristic may include at least one of a kind and an intensity of the noises. The image processing unit 420 may perform scaling for an inputted image on the basis of the generated reference data.

According to an exemplary embodiment, the image processing unit 420 may convert a low resolution image having noises into a high resolution image. More specifically, the image processing unit 420 may predict, if an image distorted by noises is inputted, the intensity of the noises by every region of the input image. Further, the image processing unit 420 may perform scaling for the inputted image on the basis of the reference data corresponding to a noise characteristic and an image characteristic of the inputted image.

The display unit 430 may display an image processed by the image processing unit 420. More specifically, in a case where the image processing unit 420 scales a low resolution image into a high resolution image, the display unit 430 may display the scaled high resolution image. The display unit 430 may include a panel driver (not shown) and a display panel (not shown) such as a Liquid Crystal Display (LCD), Organic Light Emitting Diode (OLED), Plasma Display Panel (PDP), a tube-based display, or the like.

Figure 5:
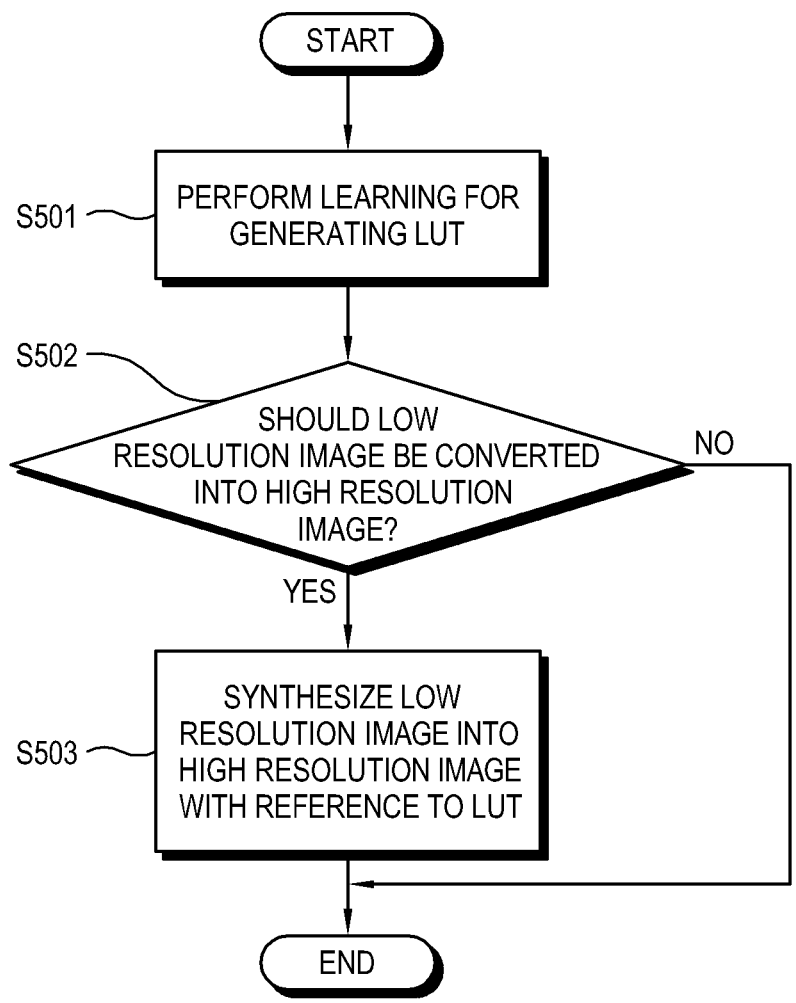
FIG. 5 is a flowchart illustrating an image processing method according to an exemplary embodiment.

FIG. 5 is a diagram illustrating an image processing method according to an exemplary embodiment. The image processing method may include a learning process which generates a lookup table (LUT), and a synthesizing process which synthesizes a low resolution image into a high resolution image.

Referring to FIG. 5, the image processing apparatus 400 performs learning for generating the LUT (S501). This learning process for generating the LUT will be described in detail below with reference to FIG. 6A.

The image processing apparatus 400 determines whether a low resolution image is to be converted into a high resolution image (S502). If it is determined that the low resolution image is not to be converted into the high resolution image, the procedure is terminated.

In contrast, if it is determined that the low resolution image is to be converted into the high resolution image, the image processing apparatus 400 synthesizes the low resolution image into the high resolution, image with reference to the LUT (S503). The processing of synthesizing the low resolution image into the high resolution image will be described in detail below with reference to FIG. 6B.

Figure 6A:
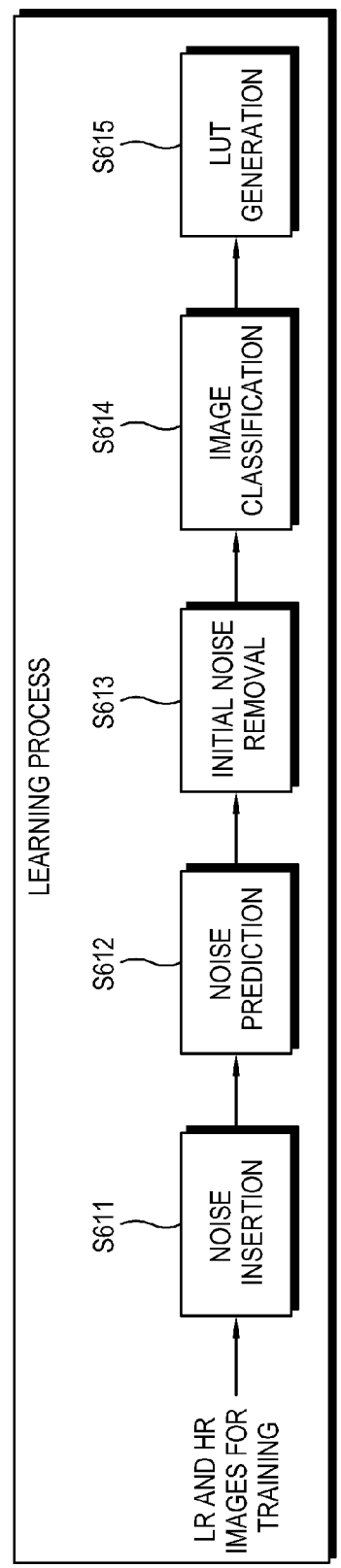
FIG. 6A is a diagram illustrating a learning process for forming a lookup table (LUT) according to an exemplary embodiment.

FIG. 6A is a diagram illustrating a learning process for generating an LUT according to an exemplary embodiment. In the learning process for generating the LUT, the LUT is generated using low and high resolution images for learning. To this end, operation S611 for noise insertion, operation S612 for noise prediction, operation S613 for initial noise removal, operation S614 for image classification, and operation S615 for LUT generation are sequentially performed.

In operation S611 for noise insertion, arbitrary noises are inserted in a low resolution image. For example, virtual noises such as Additive White Gaussian Noise (AWGN) may be inserted in the low resolution image.

In operation S612 for noise prediction, the intensity of the noises is predicted. In this respect, a variety of methods may be used to predict the intensity of the noises. According to an exemplary embodiment, a dispersion value may be calculated with respect to flat regions in the image, and the calculated dispersion value may then be considered as the intensity of the noises. According to another exemplary embodiment, movement estimation/compensation may be performed in an image time axis, blocks having good movement estimation only may be extracted, and a dispersion value of movement estimation errors of the extracted blocks may then be considered as the intensity of the noises. According to still another exemplary embodiment, time and space characteristics are all used to predict the noises, it is understood that all exemplary embodiments are not limited to the above-described prediction methods, and any existing prediction method may be used in another exemplary embodiment.

The intensity of noises does not significantly vary for every image. Thus, it may be considered that images present in the same shot or in a certain time frame have the same intensity of noises. Furthermore, the prediction of the intensity of the noises may be applied to both the learning process for generating the LUT and the synthesizing processing for synthesizing the low resolution image into the high resolution image (operation S503 in FIG. 5).

In operation S613 for initial noise removal, noises are removed. As the noises have random patterns, it may be difficult to classify images in a noisy state. Further, since noises badly affect exact high frequency synthesized information generation, the noises are firstly removed. To this end, a variety of noise removal (NR) techniques may be used. For example, a bilateral filter is a possible technique which may be used. Furthermore, wavelet noise reduction using Gaussian scale mixture (GSM) may be used. The K-singular value decomposition (K-SVD) algorithm forms an LUT or dictionary through learning with respect to a variety of noise patches. In this case, noises are removed in such a manner that a plurality of optimal patches corresponding to respective noise-distorted patches is searched from an LUT obtained by SVD, and then a weight average thereof is calculated. It is understood that all exemplary embodiments are not limited to the above-described noise removal techniques, and a variety of noise removal techniques such as a low-pass filter, median filter, Wiener filter, or the like may be used in other exemplary embodiments.

In operation S614 for image classification, image classes are classified according to a noise characteristic and an image characteristic. According to an exemplary embodiment, each of a plurality of first classes which is classified according to the noise characteristic may be classified into a plurality of second classes according to the image characteristic.

The image classification is performed as follows. First, pairs of low resolution (LR) images and high resolution (HR) images are generated from the LR images and the HR images corresponding to the LR images. In this respect, the pairs of the LR and HR images are classified into the plurality of first classes according to the intensity of noises. Then, the pairs having a similar high frequency characteristic among the pairs of the LR and HR images included in each first class are clustered to then be classified into the plurality of second classes.

Figure 7:
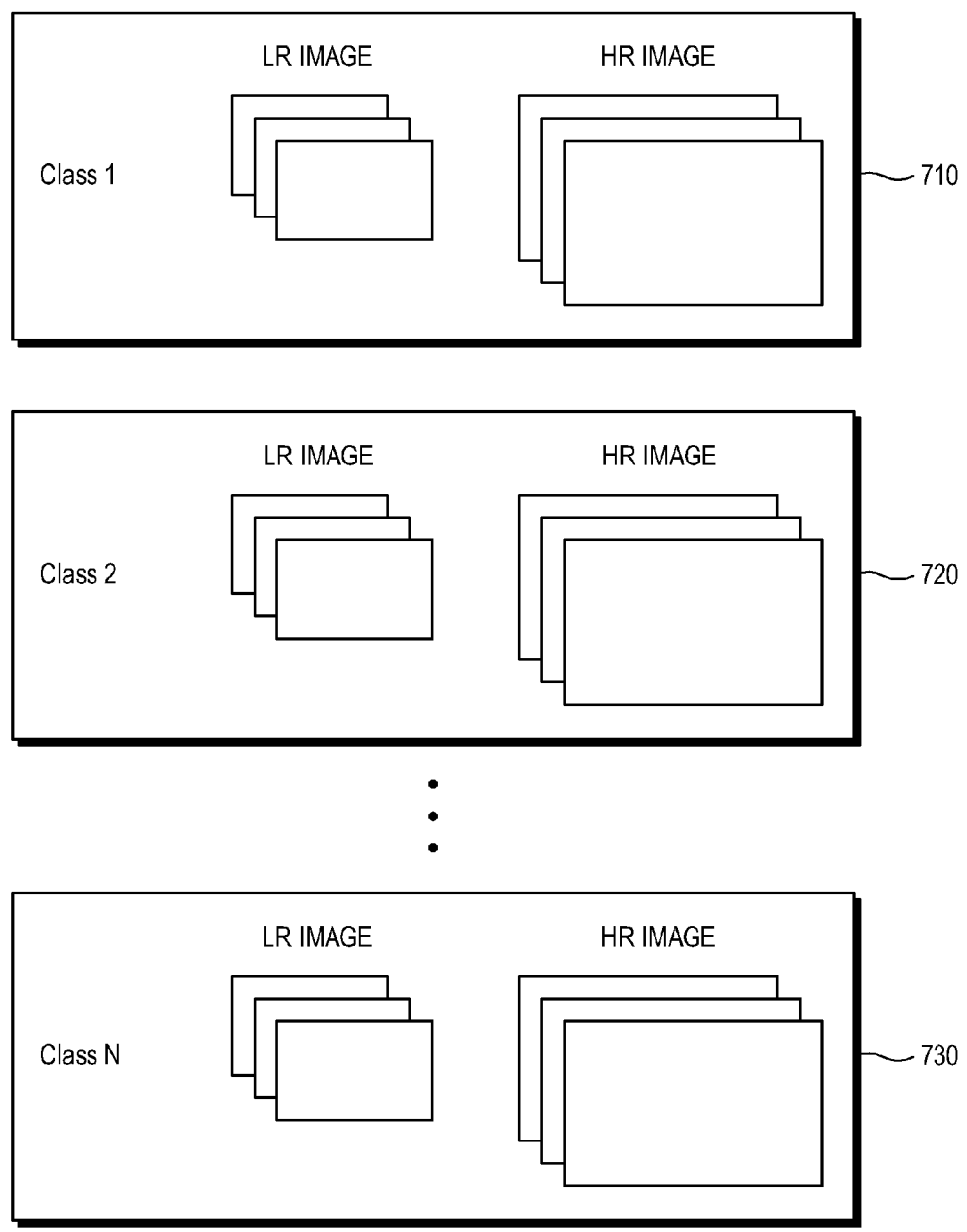
FIG. 7 is a diagram illustrating image classes which are classified according to a noise characteristic and an image characteristic according to an exemplary embodiment.

The pairs of the LR and HR images classified into the second classes are shown in FIG. 7. FIG. 7 illustrates an example of image classes classified according to the noise characteristic and the image characteristic, according to an exemplary embodiment. The pairs of the LR and HR images included in each class have similar noise and image characteristics. For example, a first second class 710 may include pairs of the LR and HR images which have a noise intensity of 1~3 and a high frequency component of 70% or more, a second second class 720 may include pairs of the LR and HR images which have a noise intensity of 1~3 and a high frequency component of 40~70%, and an Nth second class 730 may include pairs of the LR and HR images which have a noise intensity of 1~3 and a high frequency component less than 40%. In the case of the example in FIG. 7, each of the second classes 710, 720, and 730 includes three pairs of the LR and HR images, respectively, though it is understood that another exemplary embodiment is not limited thereto. The pairs of the LR and HR images that belong to each class are employed to generate the LUT for each class.

In operation S615 for LUT generation, an LUT or dictionary is generated for every class.

Noises are various in kind. In the above description, the Additive White Gaussian Noise is exemplified for the convenience of description, but there may be present a Rayleigh, gamma, exponential, uniform, or salt & pepper noise or the like. Thus, the LUT may be generated in consideration of only the intensity of noises, or may be generated in consideration of both the kind and the intensity of noises.

Figure 6B:
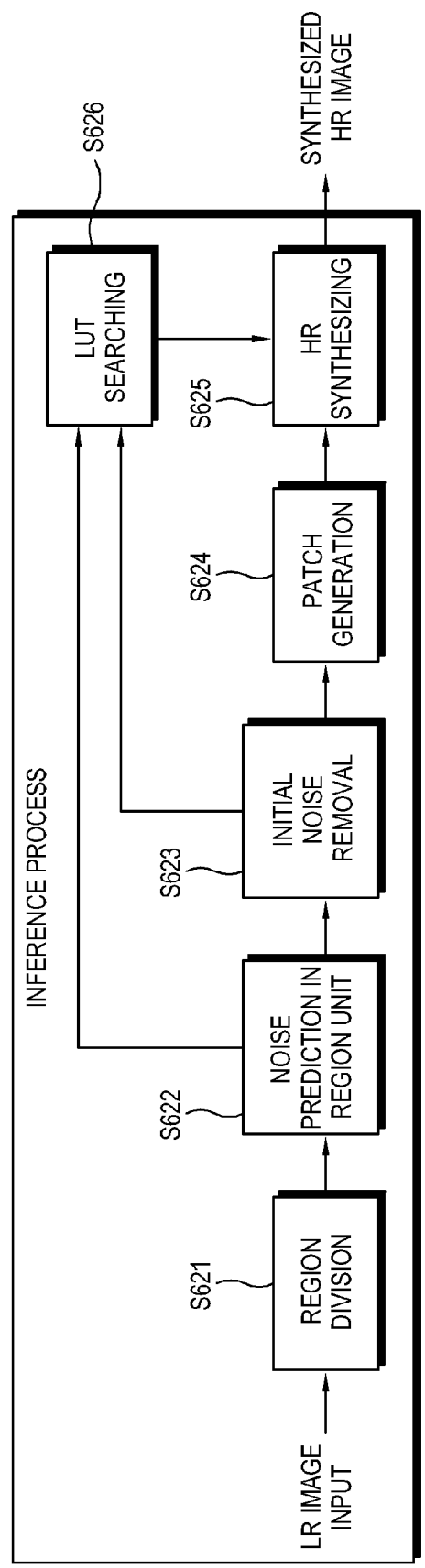
FIG. 6B is a diagram illustrating a process of synthesizing a low resolution image into a high resolution image according to an exemplary embodiment.

FIG. 6B illustrates a process of synthesizing a low resolution image into a high resolution image according to an exemplary embodiment. In the synthesizing process, a high resolution image is synthesized using a low resolution image. To this end, operation S621 for region division, operation S622 for noise prediction by every region, operation S623 for initial noise removal, operation S624 for patch generation, and operation S625 of high resolution image synthesizing are sequentially performed. In operations S622, S623 and S625, operation S626 for LUT searching may be further performed.

In operation S621 for region, division, an inputted low resolution image is divided in a predetermined region unit.

In operation S622 for noise prediction by every region, the intensity of noises is predicted by every region divided in operation S621. The prediction of the intensity of the noises may be performed in a similar manner as in operation S612 for noise prediction in the learning process for generating the LUT as described with reference to FIG. 6A.

In operation S623 for initial noise removal, the noises are removed. The noise removal may be performed in a similar manner as in operation S613 for initial noise removal in the learning process for generating the LUT as described with reference to FIG. 6A.

In operation S624 of patch generation, a low resolution image with noises being removed is divided in a patch unit.

In operation S625 for high resolution image synthesizing, the LUT is searched to obtain each patch and high frequency synthesizing information corresponding to the intensity of noises and an image characteristic. The high frequency synthesizing information may be a high frequency component itself, or may be weight information for directly obtaining high resolution information from low resolution information through linear combination. Then, a high resolution image patch may be generated from the high frequency synthesizing information and the low resolution image patch, to thereby synthesize a high resolution image.

Hereinafter, a process of generating an LUT for every class will be described with reference to FIGS. 8 and 9. For the convenience of description, a case that an image is enlarged to two times is exemplified, though it is understood that another exemplary embodiment is not limited thereto.

Figure 8:
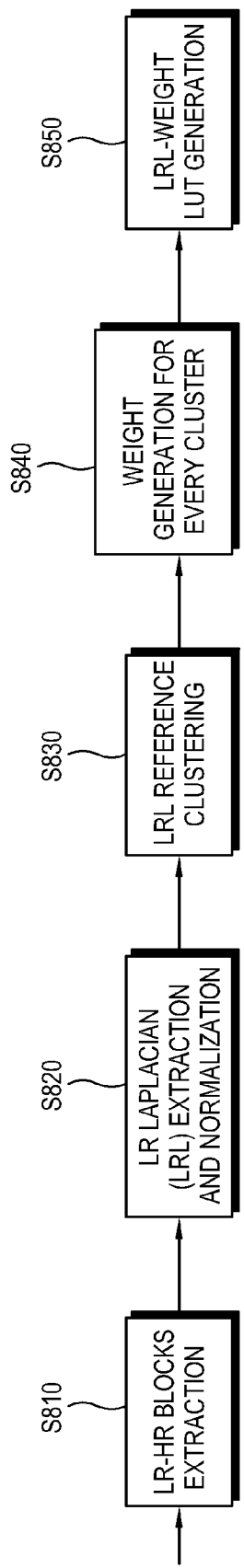
FIG. 8 is a block diagram illustrating a process of generating an LUT for every class according to an exemplary embodiment.
Figure 9:
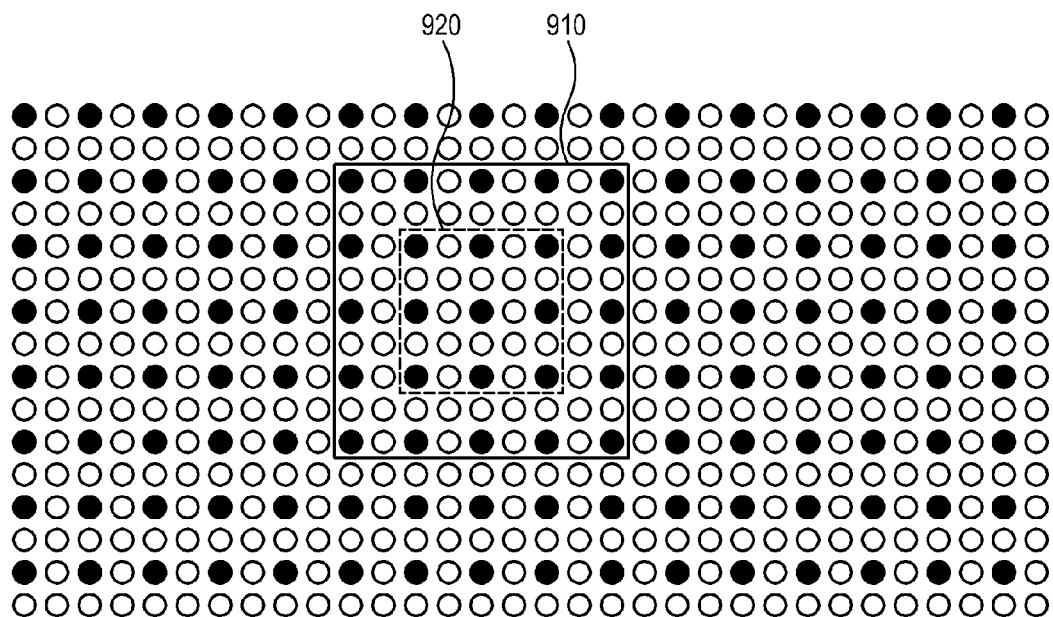
FIG. 9 is a diagram illustrating a process of extracting pairs of low resolution (LR) blocks and high resolution (HR) blocks according to an exemplary embodiment.

FIG. 8 is a block diagram illustrating a process of generating an LUT for every class according to an exemplary embodiment. Referring to FIG. 8, in the process of generating the LUT for every class, an LUT is generated for storing therein high frequency information for generating a high resolution image for every class. To this end, operation S810 for LR and HR blocks extraction, operation S820 for LR Laplacian (LRL) extraction and normalization, operation S830 for LRL reference clustering, operation S840 for weight generation for every cluster, and operation S850 for LRL-weight LUT generation are sequentially performed.

In operation S810 for LR and HR blocks extraction, a plurality of low resolution (LR) blocks and a plurality of high resolution (HR) blocks are extracted from a low resolution (LR) image and a high resolution (HR) image corresponding to the low resolution image. In this respect, the LR blocks and the corresponding HR blocks are obtained from the pairs of the LR and HR images classified in the first classes. The extracted LR blocks and corresponding HR blocks form pairs of the LR blocks and HR blocks.

The process of extracting the pairs of the LR and HR blocks will be described in more detail with reference to FIG. 9. FIG. 9 is a diagram illustrating a process of extracting example pairs of LR blocks 910 and HR blocks 920 according to an exemplary embodiment. In the example shown in FIG. 9, the sizes of the LR block 910 and the HR block 920 are 5×5, respectively. The LR block 910 is indicated by a solid line includes LR pixels of 5×5. The HR block 920 corresponding to the LR block 910 is indicated by a dotted line and includes HR pixels of 5×5. The HR block 920 is arranged in a center area of the LR block 910. In this respect, a variety of pairs of the LR and HR images may be selected for effective learning. Then, the LR blocks 910 and the HR blocks 920 are extracted on the basis of a sampled LR image, with a suitable interval of one or more pixels in horizontal and vertical directions.

Referring back to FIG. 8, in operation S810 for LR and HR block extraction, the extraction of the pairs of the LR and HR blocks is performed for each first class. Considering that the extracted LR and HR blocks are used for learning, the LR and HR blocks are hereinafter represented as LRt and HRt, respectively.

In operation S820 for LRL extraction and normalization, a Laplacian operator is applied to each LRt block to sufficiently consider a high frequency characteristic and an edge characteristic, to extract LRt Laplacian (LRLt) blocks. According to an exemplary embodiment, a 3×3 Laplacian operator as shown in the following table 1 may be applied to each pixel of the LRt block, though it is understood that another exemplary embodiment is not limited thereto.

TABLE 1

| -1 | -1 | -1 |
|----|----|----|
| -1 | 8  | -1 |
| -1 | -1 | -1 |

After the LRLt blocks are extracted, normalization is performed for each LRLt block. If an average of the LRLt blocks is represented as μ, and standard deviation is represented as σ, the normalization is performed for each pixel value X in the LRLt block, to thereby obtain a result according to the following formula 1:

$$\frac{x-\mu}{\sigma} \quad \text{[Formula 1]}$$

Here, the normalized LRLt may be represented as $LRL_t^n$. Through this process, the pairs of the LRt and HRt are changed into pairs of a $LRL_t^n$-$LR_t$-$HR_t$ shape.

In operation S830 for LRL clustering, the block pairs having a similar image characteristic are clustered. When the $LRL_t^n$-$LR_t$-$HR_t$ shaped block pairs of a total number M are present for learning, if an m-th block pair BPm is ($LRL_{t,m}^n$, $LR_{t,m}$, $HR_{t,m}$), initial learning information may be defined as the following formula 2:

$$\{BP_m | 0 \leq m \leq M-1\} \quad \text{[Formula 2]}$$

In this case, the clustering is performed on the basis of the $LRL_t^n$ blocks, to thereby group the pairs having a similar Laplacian characteristic. K-means clustering or the like may be employed for the clustering.

If it is assumed that clusters of a number L, which is less than M, are grouped, $LRL_t^n$ cluster center blocks of the number L may be defined as the following formula 3:

$$\{LRLC_{t,l}^n | 0 \leq l \leq L-1\} \quad \text{[Formula 3]}$$

Each cluster may include at least one pair of the LRt and HRt blocks having a similar characteristic.

In operation S840 for weight generation for every cluster, a weight suitable for each cluster is obtained through training.

The following formula 4 may be made between pixels in each pair of the LRt and HRt blocks:

$$I_H(i, j) = \sum_{x=0}^{N-1}\sum_{y=0}^{N-1} w_{ij}(x,y) I_L(x,y) \quad \text{[Formula 4]}$$

In this respect, $I_H(i,j)$ represents pixels in a position (i,j) in the HR blocks, and $I_L(x,y)$ represents pixels in a position (x,y) in the LR blocks. For example, in the case of the LR block and the HR block in which N is five as shown FIG. 9 (that is, the sizes of the blocks are 5×5), i, j, x and y satisfy 0≤i, j, x, y≤4. That is, one 5×5 weight is present for every HR position.

As described above, each of the clusters of the number L includes at least one pair of the LRt and HRt block. For example, if it is assumed that pairs of the LRt and HRt blocks of a number $CS_l$ in an l-th cluster, the following formula 5 is made:

$$\sum_{l=0}^{L} CS_l = M \quad \text{[Formula 5]}$$

That is, since the pair of LRt and HRt blocks of the total number M are present, the total number of the pairs of the LRt and HRt blocks included in the respective clusters is M.

In the learning process for the pairs of the LRt and HRt blocks included in the l-th cluster, a least mean square (LMS) algorithm may be employed. Since the pairs of the LRt and HRt blocks included in the l-th cluster have a similar Laplacian characteristic, the weights according to the formula 4 may be similar to each other. In this case, the weight corresponding to the position (i, j) in the HRt block with respect to the LRt block included in the l-th cluster is defined as the following formula 6:

$$w_{ij}^l(x, y)(0 \leq x, y \leq N-1) \quad \text{[Formula 6]}$$

In operation S850 for LRL-weight LUT generation, the LUT including high frequency information on the plurality of classes may be generated. The LUT generated in this way is shown in FIG. 10, which illustrates a final LUT for the N-th class.

Figure 10:
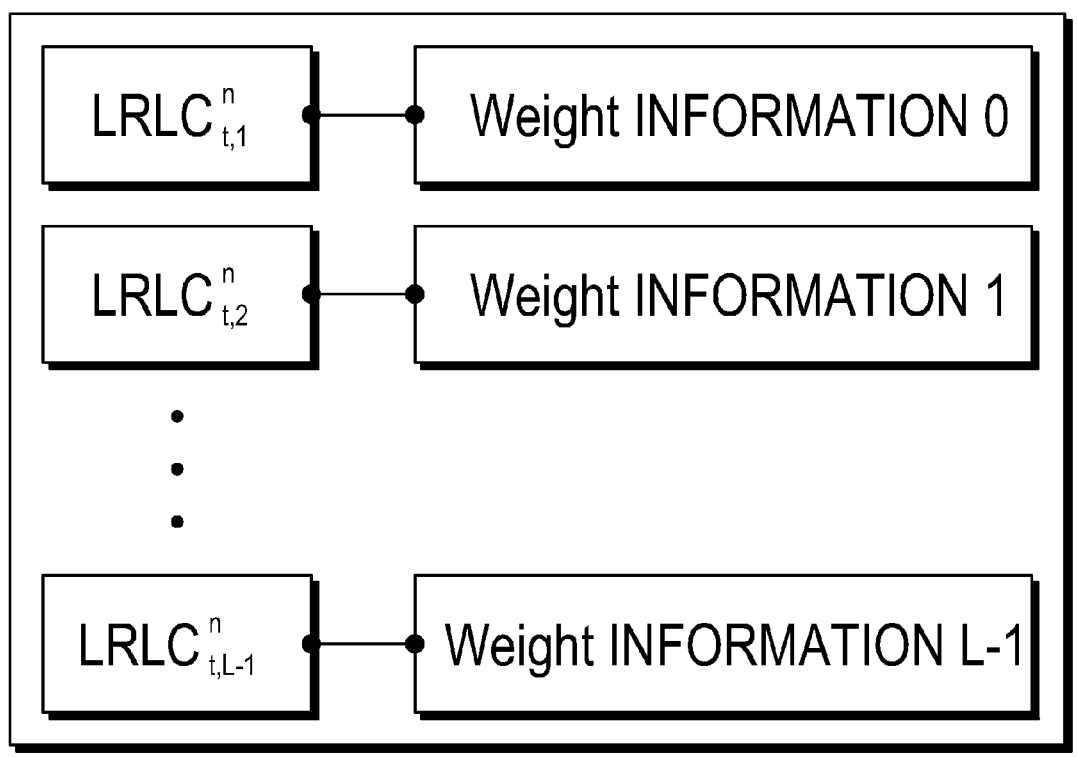
FIG. 10 is a diagram illustrating a final LUT with respect to an N-th class according to an exemplary embodiment.

Referring to FIG. 10, the final LUT (or dictionary) includes pairs of $LRLC_{t,l}^n$ of the number L for indexing and weights corresponding thereto. Each of the $LRLC_{t,l}^n$ has a size of N×N, and weight coefficients of N×N are present in the HR positions in the weights. Thus, if the HR positions are N×N, the total number of the weight coefficients for each cluster is N4. For example, if N is five, and L is 512, the size of the total weight information in the LUT is 320 KB (where it is assumed that every coefficient occupies 1 byte). In consideration of the size of the $LRLC_{t,l}^n$, the total size of the LUT may be about 333 KB. In this way, the LUT including high frequency information may be generated with respect to all the classes of the number N. Since the learning is performed using the HR image without noises, the final result becomes an image which is scaled with noises being removed.

The LUT generated as described above is used to synthesize each LR block into the HR block in the high resolution image synthesizing process to be described later.

Figure 11:
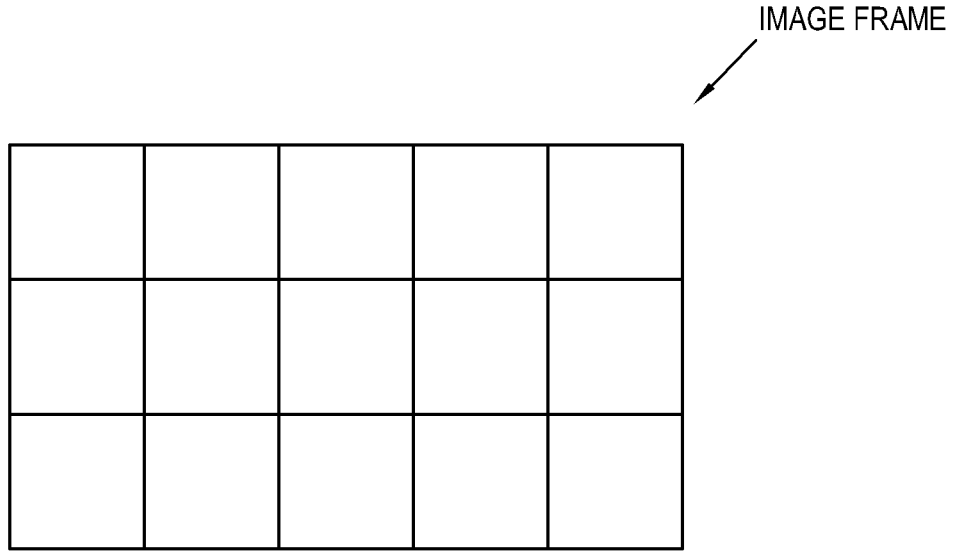
FIG. 11 is a diagram illustrating an image frame which is divided into a plurality of regions according to an exemplary embodiment.

Hereinafter, the process of synthesizing a low resolution image into a high resolution image will be described in detail with reference to FIGS. 11 and 12. FIG. 11 illustrates an image frame which is divided into a plurality of regions according to an exemplary embodiment.

If an LR image is distorted by noises, the intensity of the noises is predicted in the same manner as in the learning process for generating the LUT. However, in this synthesizing process, the intensity of the noises is predicted in a predetermined region unit, differently from the learning process.

In the case of real images distorted by noises, the noises are hardly uniformly distributed over the images, and the intensity of the noises may vary locally. Thus, the noises may be predicted in the region unit.

According to an exemplary embodiment, as shown in FIG. 11, the regions of the image may be divided without overlapping between the regions. According to another exemplary embodiment, the regions may be divided to overlap each other. According to still another exemplary embodiment, the regions may be divided on the basis of objects, foregrounds and backgrounds, other than rectangles of a predetermined size.

If the noises are predicted in the region unit, initial noise removal is performed for an, inputted LR image in a similar manner as in the learning process, in consideration of the intensity of the noises for every region. For example, Wiener filtering may be performed for the concerned region in consideration of the intensity of the noises, though it is understood that another exemplary embodiment is not limited thereto.

FIG. 12 is a diagram illustrating a process of generating HR blocks corresponding to LR blocks, according to an exemplary embodiment. As shown in FIG. 12, an LR image from which initial noises are removed for every region is divided into LR blocks of a predetermined number in an overlapping manner. If it is assumed that inputted LR blocks are represented as LRin, the LRL is extracted and normalized for each LRin block as shown in FIG. 8, and $LRLC_l^n$ which is similar to $LRL_{in}^n$ is searched in the LUT. That is, distances between the inputted $LRL_{in}^n$ and $LRLC_l^n$ of the number L included in the LUT are calculated to search for a cluster having a minimum distance. This process may be referred to as matching. A variety of distance measures such as well-known L1-norm or L2-norm may be employed for distance measurement for the matching. If it is assumed that an optimal cluster obtained through the matching process is an lbest-th cluster, pixels in the position (i,j) in the HR blocks corresponding to the inputted LR blocks are obtained according to the formula 4, above, using $w_{ij_{best}}^l(k,l)$.

On the other hand, two or more pixels may be generated in a specific position in the HR blocks, according to how the overlapping is performed in FIG. 12. In this case, an average thereof is obtained and determined as final HR pixels. Moreover, in this case, noise removal and up-scaling are simultaneously performed for every region as described above.

In the case of strong noises, noises pixels may distort the LUT itself, or may affect the matching in the inference process. To solve this problem, if a specific pixel is larger than a predetermined first threshold value T1 and 8 pixels adjacent to the specific pixel are all smaller than a predetermined second threshold value T2 in the Laplacian result, the specific pixel may be considered as the noise pixel and excluded from the LUT generation and the matching in the inference process. For example, in the learning process, all (i.e., 100%) of the noise pixels may be excluded for learning, or may be replaced with an average value of surrounding pixel values for learning. In this respect, the second threshold value T2 is generally smaller than the first threshold value T1.

The above process is applied to the case of each patch in the inputted image. That is, pixels considered as noise pixels are excluded for matching.

While not restricted thereto, the exemplary embodiments can also be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, the exemplary embodiments may be written as computer programs transmitted over a computer-readable transmission medium, such as a carrier wave, and received and implemented in general-use digital computers that execute the programs. Moreover, while not required in all aspects, one or more units of the image processing apparatus 400 can include a processor or microprocessor executing a computer program stored in a computer-readable medium, such as a local storage.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. An image processing apparatus comprising:
   an image input unit which receives an image; and
   an image processing unit which generates reference data according to a plurality of learning images classified into a plurality of first classes according to a noise characteristic and a plurality of second classes according to an image characteristic, and which performs scaling for the received image according to the generated reference data.

2. The image processing apparatus according to claim 1, wherein the image processing unit classifies each of the plurality of first classes into the plurality of second classes.

3. The image processing apparatus according to claim 1, wherein the plurality of learning images comprises pairs of low resolution images and high resolution images corresponding to the low resolution images.

4. The image processing apparatus according to claim 3, wherein the reference data comprises pairs of the low resolution images and corresponding weights which are set according to the image characteristic.

5. The image processing apparatus according to claim 1, wherein the image processing unit converts a low resolution image having noise into a high resolution image without the noise.

6. The image processing apparatus according to claim 1, wherein the image characteristic comprises at least one of a high frequency component and an edge characteristic of the image.

7. The image processing apparatus according to claim 1, wherein the noise characteristic comprises at least one of a kind and an intensity of noises.

8. The image processing apparatus according to claim 1, wherein the image processing unit predicts, in a case where the received image is distorted by noise, an intensity of the noise in a region unit of the received image.

9. The image processing apparatus according to claim 1, wherein the image processing unit performs the scaling for the received image according to the reference data corresponding to a noise characteristic and an image characteristic of the received image.

10. The image processing apparatus according to claim 1, wherein the image processing unit inserts noise in a low resolution image of the plurality of learning images, predicts an intensity of the inserted noise in the low resolution image, removes the noise from the low resolution image, classifies the low resolution image and a corresponding high resolution image into a first class, of the plurality of first classes, according to the predicted intensity of the inserted noise, and classifies the low resolution image and the corresponding high resolution image into a second class, of the plurality of second classes, according to the image characteristic.

11. An image processing method comprising:
    receiving an image;
    generating reference data according to a plurality of learning images classified into a plurality of first classes according to a noise characteristic and a plurality of second classes according to an image characteristic; and performing scaling for the received image according to the generated reference data.

12. The method according to claim 11, wherein each of the plurality of first classes is classified into the plurality of second classes.

13. The method according to claim 11, wherein the plurality of learning images comprises pairs of low resolution images and high resolution images corresponding to the low resolution images.

14. The method according to claim 13, wherein the reference data comprises pairs of the low resolution images and corresponding weights which are set according to the image characteristic.

15. The method according to claim 11, wherein the performing the scaling comprises converting the received image, which is a low resolution image having noises, into a high resolution image.

16. The method according to claim 11, wherein the image characteristic comprises at least one of a high frequency component and an edge characteristic of the image.

17. The method according to claim 11, wherein the noise characteristic comprises at least one of a kind and an intensity of noises.

18. The method according to claim 11, wherein the performing the scaling comprises predicting an intensity of noise in a region unit of the received image in a case where the received image is distorted by the noise.

19. The method according to claim 11, wherein the performing the scaling comprises performing the scaling for the received image according to the reference data corresponding to a noise characteristic and an image characteristic of the received image.

20. A non-transitory computer readable recording medium having recorded thereon a program executable by a computer for performing the method of claim 11.

21. A method of generating reference data used to scale an image, the method comprising:
  inserting noise in a low resolution image;
  predicting an intensity of the inserted noise in the low resolution image;
  removing the noise from the low resolution image;
  classifying the low resolution image and a corresponding high resolution image into a first class, of a plurality of first classes, according to the predicted intensity of the inserted noise;
  classifying the low resolution image and the corresponding high resolution image into a second class, of a plurality of second classes, according to an image characteristic; and
  generating the reference data according to the classified low resolution image.

22. The method according to claim 21, wherein the generating the reference data comprises generating the reference data comprising a pair of the low resolution image and a corresponding weight according to the image characteristic.

23. A non-transitory computer readable recording medium having recorded thereon a program executable by a computer for performing the method of claim 21.

* * * * *